UNITED STATES PATENT OFFICE 2,450,806

RUST PREVENTIVE CHROMIUM COMPOUNDS AND COMPOSITIONS CONTAINING THEM

Paul R. McCarthy, Allison Park, Pa., assignor to Gulf Research & Development Company, Pittsburgh, Pa., a corporation of Delaware No Drawing. Application December 7, 1945, Serial No. 633,557

9 Claims. (Cl. 106—14)

This invention relates to the prevention of corrosion of metals and is particularly concerned with a composition of matter adapted to inhibit or prevent surface corrosion of metals when applied thereto in the form of a coating.

In the handling and storage of metal articles, it is desirable to inhibit or prevent as much as possible the corrosion of the surface of such articles resulting upon exposure of fresh cut surfaces of the metal to the atmosphere. Numerous products have heretofore been developed for coating the surfaces of metal articles to prevent such corrosion. However, these products have been subject to numerous disadvantages.

It is an object achieved by this invention to provide a composition of matter adapted to retard or prevent corrosion of metal surfaces, particularly in the presence of water.

A further object achieved by this invention is to provide as a new corrosion-preventive composition of matter a water-insoluble reaction product of 2-oleyl-4-methyl-4-hydroxymethyl-2-oxazoline with chromium trioxide.

A still further object achieved by this invention is to provide a process for the production of a corrosion-resistant water-insoluble reaction product of 2-oleyl-4-methyl-4-hydroxymethyl-2-oxazoline with chromium trioxide.

The structural formula for 2-oleyl-4-methyl-4-hydroxymethyl-2-oxazoline is as follows:

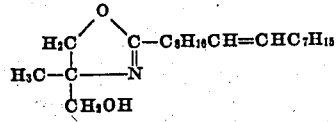

This invention is predicated upon the discovery that when 2-oleyl-4-methyl-4-hydroxymethyl-2-oxazoline is reacted with chromium trioxide in such a manner as to effect oxidation of the 2-oleyl-4-methyl-4-hydroxymethyl-2-oxazoline, a water-insoluble viscous reaction product is obtained which has good resistance to corrosion and which, when applied to the surface of metal objects, is capable of protecting such objects from deterioration due to exposure. I have found that when 2-oleyl-4-methyl-4-hydroxymethyl-2-oxazoline is heated to a temperature within the range of about 300° to about 500° F. in the presence of an adequate amount of chromium trioxide, gradual reduction of the chromium trioxide is effected with the formation of a dark green viscous liquid which is highly soluble in organic solvents and is insoluble in water.

The water-insoluble reaction product thus obtained has the property when applied to metal surfaces of preventing the corrosion of such surfaces for extended periods of time. The exact identity of the product of the oxidation of 2-oleyl - 4 - methyl - 4 - hydroxymethyl - 2 - oxazoline with chromium trioxide obtained according to my invention is not accurately known. It is possible that the oxidation may attack the unsaturated side chain or the double bond of the oxazoline group or the hydroxymethyl group, or it is possible that any two or more of these reactions may take place. It appears most likely that the hydroxymethyl group will be attacked first with the function of an acid group with the simultaneous reduction of the chromium trioxide to chromic oxide and that thereafter the chromic oxide reacts with the acid group to form the dark green viscous reaction product.

The reaction product of the present invention may be obtained by heating 2-oleyl-4-methyl-4-hydroxymethyl-2-oxazoline with chromium trioxide until the reaction mixture, which is dark brown at the start, turns dark green and becomes more viscous. In carrying out the reaction, I have found that the amount of chromium trioxide employed should be between about 8 and 12 per cent by weight based on the weight of the 2-oleyl-4-methyl-4-hydroxymethyl- 2 -oxazoline. A reaction mixture, containing about one part by weight of chromium trioxide to 10 parts by weight of 2-oleyl-4-methyl -4- hydroxymethyl-2-oxazoline has been found to be particularly satisfactory. An excess of chromium trioxide is, in general, to be avoided, since decomposition products of excess chromium compounds may be difficult to separate from the reaction product. In general, a slight excess of the oxazoline is desirable in the final product. The chromium trioxide may be used undiluted or it may be used in the form of an aqueous solution. Better contact is obtained between the 2-oleyl-4-methyl-4-hydroxymethyl-2-oxazoline and chromium trioxide if the chromium trioxide is in the form of an aqueous solution. It is desirable from the standpoint of reaction time to use a chromium trioxide solution having a concentration above about 10 per cent of chromium trioxide. A more dilute solution can be used without altering the nature of the reaction product, but when using a more dilute solution, a longer reaction time is required. The reaction mixture is heated up slowly especially when a very dilute chromium trioxide aqueous solution is used to prevent excessive foaming which occurs when water is expelled from the mixture. The maximum temperature reached during the heating is advantageously not above about 500° F. and generally is within the range of about 300° to about 500° F. Heating is continued for a time sufficient to effect the formation of a dark green viscous liquid. The green viscous liquid reaction product is then washed with water, preferably hot water, to remove water-soluble constituents of the reaction mixture. The washed reaction product is then heated to remove water.

The water-insoluble reaction product of the present invention is a viscous material of the consistency of thick honey, and has a molecular weight between about 1100 and 1200. Although the reaction product may be used per se as a rust inhibiting composition, I have found that the reaction product because of its high viscosity is more easily applied to metals to be protected if it is dissolved in a solvent. Sufficient solvent is used to yield a solution which can be applied to the article either by a dipping, a spraying, or a brushing procedure. The solvent does not remain on the metal but evaporates, leaving the metal coated with the reaction product. The solvent may be any relatively light organic solvent, such as hexane, benzene, petroleum ether, carbon tetrachloride, or a light naphtha such as a petroleum oil distillate of 40 to 50° A. P. I. gravity, not less than 50 per cent boiling below about 340° F. and an end boiling point of not more than about 450° F. with a flash point not lower than about 100° F. The amount of solvent employed will depend somewhat on the thickness of the protective coating desired upon the metal. For instance, the solvent may constitute up to about 75 per cent by weight of the final composition, preferably constituting between about 25 and about 75 per cent by weight of the final composition. When a thick coating is desired, the amount of solvent is kept near the minimum, but, when a thin coating is preferred, considerably more solvent may be used with the reaction product. I have found that a particularly advantageous composition consists of equal parts by weight of solvent and reaction product.

While the reaction product of the present invention effectively inhibits the corrosion of metals for extended periods of time, I have found that the period of protection may be lengthened if a water-insoluble soap is used in conjunction with the water-insoluble reaction product resulting from the reaction of 2-oleyl-4-methyl-4-hydroxymethyl-2-oxazoline with chromium trioxide. The period of protection is considerably lengthened if the reaction product of the present invention is mixed with the zinc soap of soya bean oil fatty acids, particularly when the mixture contains approximately equal proportions of the reaction product and the soap. In place of the zinc I may substitute other metals which form water-insoluble soaps, such as calcium, barium, strontium, aluminum, etc. The soya bean oil fatty acids may be substituted by the fatty acids of other oils, such as cotton seed, peanut, tung, linseed, perilla, corn, and oiticica. In place of oil fatty acids which are composed of mixtures of fatty acids, a single fatty acid may be used, such as palmitic, stearic, oleic, linoleic, etc. The amount of soap employed may be between about 25 and 75 per cent based on the weight of the resulting product.

In the following specific example 2-oleyl-4-methyl-4-hydroxymethyl-2-oxazoline was reacted with a 20 per cent aqueous solution of chromium trioxide. The example is not, however, to be considered as a limitation of the invention, since many modifications may be made without departing from the spirit and the scope of the invention.

The 2-oleyl-4-methyl-4-hydroxymethyl-2-oxazoline used in the following preparation was a commercial material boiling in the range of 174° to 305° C; it showed an average molecular weight of 350. Its chemical composition was as follows:

| Constituents | Percent by weight | |
| --- | --- | --- |
| | Theoretical | By Actual Determination |
| C | 75.2 | 74.3 |
| H | 11.7 | 11.5 |
| O | 9.1 | [1] 9.8 |
| N | 4.0 | 4.4 |

[1] Determined by difference.

Example 2-oleyl-4-methyl-4-hydroxymethyl-2-oxazoline was mixed with 10 percent by weight of chromium trioxide using a 20-per cent aqueous solution at room temperature. The mixture was then stirred and slowly heated to 200 to 240° F. It was held in this temperature range until foaming subsided and dehydration was substantially complete. The temperature was then raised over a period of from 30 to 60 minutes to 420 to 450° F. and held in this range for approximately 30 minutes. During this final heating period reaction was completed and the material became considerably more viscous. The material was then cooled and washed with boiling water to remove any water-soluble products present. The water-insoluble reaction product was then heated to drive off any residual water. The resulting product was a dark green viscous liquid which was highly soluble in organic solvents.

The water-insoluble reaction product had the consistency of thick honey and a molecular weight of 1160. Its composition by chemical analysis was as follows:

| Constituents | Per cent by Wt. |
| --- | --- |
| C | 66.0 |
| H | 10.4 |
| O | [1] 14.8 |
| N | 3.2 |
| Cr | 5.6 |

[1] Determined by difference.

In order to illustrate the utility of the water-insoluble reaction product produced according to the above procedure, steel panels coated with the reaction product were subjected to tests in a weatherometer. The weatherometer employed in evaluating the effectiveness of the reaction product as a rust inhibitor was a National Carbon Weathering Unit, model X-1-A. In order to facilitate the application of the reaction product to the steel panels, a solution was made by dissolving the water-insoluble reaction product in an equal amount by weight of a petroleum distillate having the following properties:

Gravity, °A. P. I. _____ 48.5
Flash point (TCC), °F _____ 104
Initial boiling point, °F _____ 312
End boiling point, °F _____ 394

The test methods employed in evaluating the reaction product were modifications of the procedure described in paragraph F-3a(7) of the "Bureau of Ships Ad Interim Specification," 52C18 (INT), dated March 1, 1944. Two polished SAE 1020 steel panels 6 inches long by 3 inches wide and ¼ inch thick were immersed in the solution of petroleum distillate and reaction product. The steel panels were then removed from the solution and allowed to dry for 48 hours, during which time the petroleum distillate evaporated, thus leaving a residual coating of reaction product on the steel panels. The two panels coated with the reaction product, a panel coated with 2-oleyl-4-methyl-4-hydroxymethyl - 2-oxazoline, and an uncoated panel, the latter two panels being used for comparison purposes, were then hung on a rack in the weatherometer. The rack on which these specimens were hung rotated once in 2 hours. During this rotation each panel was sprayed 20 minutes with fresh water; during the remaining hour and 40 minutes the panels were subjected to intense ultraviolet radiation produced by a carbon arc lamp. The steel panels were examined daily for the appearance of rust spots. The panel coated with 2-oleyl-4-methyl-4-hydroxymethyl-2-oxazoline and the uncoated panel showed considerable rusting in one day. Of the two panels coated with the reaction product, one showed rusting only after 31 days of continuous treatment in the weatherometer, the other panel did not corrode until it had been in the weatherometer for 59 days. Two more sets, each set consisting of two panels coated with reaction product, were tested for checking purposes. One of the panels corroded on the thirty-first day, but three of the panels did not corrode until 51 days in the weatherometer. A comparison of the reaction product-coated panels with the panel coated with 2-oleyl-4-methyl-4-hydroxymethyl-2-oxazoline and with the uncoated panel shows clearly the protective effect produced by the reaction product of the present invention.

In order to illustrate the increased period of protection obtained when a water-insoluble metal soap of a fatty oil is used in conjunction with the water-insoluble reaction product of the present invention, a composition was prepared consisting of 25 per cent by weight of the water-insoluble reaction product of the present invention, 25 per cent by weight of a zinc soap of soya bean oil, and 50 per cent by weight of petroleum distillate. Two SAE 1020 steel panels were immersed in this composition and then allowed to dry for 48 hours as described above. The panels then were tested in the weatherometer according to the above-described procedure. An additional panel coated only with the zinc soap of soya bean oil was also tested. The panels which were coated with a mixture of reaction product and the zinc soap of soya bean oil were still bright and shiny and contained no rust spots even after sixty days of continuous treatment in the weatherometer. The panel coated with the zinc soap of soya bean oil corroded after nine days of treatment. A comparison of the reaction product-coated panels with the panels coated with a mixture of the reaction product and the zinc soap of soya bean oil shows clearly the increased period of protection obtained by the addition of the zinc soap of soya bean oil to the reaction product of the present invention. The utility of the reaction product as a rust inhibitor can further be noted by comparing the relatively long period of protection obtained with the mixture of reaction product and the zinc soap of soya bean oil with the relatively short period of protection obtained with only the zinc soap of soya bean oil.

While the invention has been described herein with particular reference to certain specific embodiments thereof by way of illustration, it is to be understood that the invention is not limited to such embodiments except as hereinafter defined in the appended claims.

What I claim is:

1. A composition of matter adapted to prevent the corrosion of metal surfaces comprising the water-insoluble product obtained by heating 2-oleyl-4-methyl - 4 - hydroxymethyl - 2 - oxazoline with chromium trioxide at a temperature within the range of about 300° to about 500° F.

2. A composition of matter adapted to prevent the corrosion of metal surfaces comprising about 25 to about 75 per cent by weight of the water-insoluble product obtained by heating 2-oleyl-4-methyl-4-hydroxymethyl-2-oxazoline with chromium trioxide at a temperature within the range of about 300° to about 500° F. and about 75 to about 25 per cent by weight of a light naphtha solvent.

3. A composition of matter adapted to prevent the corrosion of metal surfaces comprising about 50 per cent by weight of the water-insoluble product obtained by heating 2-oleyl-4-methyl-4-hydroxymethyl-2-oxazoline with chromium trioxide at a temperature within the range of about 300° to about 500° F. and about 50 per cent by weight of a petroleum oil distillate of 40 to 50° A. P. I. gravity.

4. A process for the production of a composition of matter adapted to prevent the corrosion of metal surfaces which comprises heating 2-oleyl-4-methyl- 4 - hydroxymethyl - 2 - oxazoline with 8 to 12 per cent by weight of chromium trioxide at a temperature in the range of about 300° to about 500° F. for a time sufficient to produce a dark green viscous liquid.

5. A process for the production of a composition of matter adapted to prevent the corrosion of metal surfaces which comprises heating 2-oleyl-4-methyl- 4 -hydroxymethyl - 2 - oxazoline with 8 to 12 per cent by weight of an aqueous solution of chromium trioxide at a temperature within the range of about 300° to about 500° F.

6. A process for the production of a composition of matter adapted to prevent the corrosion of metal surfaces which comprises heating 2-oleyl-4-methyl- 4 - hydroxymethyl - 2 - oxazoline with 8 to 12 per cent by weight of an aqueous solution of chromium trioxide at a temperature within the range of about 300° to about 500° F. for a time sufficient to effect the formation of a dark green viscous liquid.

7. A process for the production of a composition of matter adapted to prevent the corrosion of metal surfaces which comprises heating 2-oleyl-4-methyl- 4 - hydroxymethyl - 2 - oxazoline with 8 to 12 per cent by weight of chromium trioxide at a temperature within the range of about 300° to about 500° F. for a time sufficient to effect the formation of a dark green viscous liquid, washing the dark green viscous liquid thus obtained with boiling water, dehydrating the washed product and recovering a water-insoluble, dark green viscous liquid.

8. A composition of matter adapted to prevent the corrosion of metal surfaces consisting of a light naphtha solvent, a water-insoluble soap and the water-insoluble product obtained by heating 2-oleyl-4-methyl-4-hydroxymethyl-2-oxazoline with chromium trioxide at a temperature within the range of about 300° to about 500° F.

9. A composition of matter adapted to prevent the corrosion of metal surfaces consisting of a light naphtha solvent, a zinc soap of soya bean oil fatty acids, and the water-insoluble product obtained by heating 2-oleyl-4-methyl-4-hydroxymethyl-2-oxazoline with chromium trioxide at a temperature within the range of about 300° to about 500° F.

PAUL R. McCARTHY.

REFERENCES CITED

The following references are of record in the file of this patent:

UNITED STATES PATENTS

| Number | Name | Date |
| --- | --- | --- |
| 1,364,134 | Morgan | Jan. 4, 1921 |
| 1,802,036 | Scheitlin | Apr. 21, 1931 |
| 2,334,071 | Cook et al. | Nov. 9, 1943 |
| 2,372,410 | Tryon | Mar. 27, 1945 |

Certificate of Correction

Patent No. 2,450,806.	October 5, 1948.

PAUL R. McCARTHY

It is hereby certified that error appears in the printed specification of the above numbered patent requiring correction as follows:

Column 2, line 14, for the word "function" read *formation*;

and that the said Letters Patent should be read with this correction therein that the same may conform to the record of the case in the Patent Office.

Signed and sealed this 28th day of December, A. D. 1948.

[SEAL]

THOMAS F. MURPHY,
*Assistant Commissioner of Patents.*